United States Patent
Jiang

(10) Patent No.: US 10,977,024 B2
(45) Date of Patent: Apr. 13, 2021

(54) METHOD AND APPARATUS FOR SECURE SOFTWARE UPDATE

(71) Applicant: SIERRA WIRELESS, INC., Richmond (CA)

(72) Inventor: Alex Jiang, Surrey (CA)

(73) Assignee: SIERRA WIRELESS, INC., Richmond (CA)

( * ) Notice: Subject to any disclaimer, the term of this patent is extended or adjusted under 35 U.S.C. 154(b) by 115 days.

(21) Appl. No.: 16/009,694

(22) Filed: Jun. 15, 2018

(65) Prior Publication Data
US 2019/0384586 A1 Dec. 19, 2019

(51) Int. Cl.
*H04L 29/06* (2006.01)
*H04L 9/32* (2006.01)
*G06F 8/65* (2018.01)

(52) U.S. Cl.
CPC .............. *G06F 8/65* (2013.01); *H04L 9/3265* (2013.01); *H04L 9/3268* (2013.01); *H04L 2209/38* (2013.01)

(58) Field of Classification Search
CPC ....... G06F 8/65; H04L 9/3265; H04L 9/3268; H04L 2209/38
See application file for complete search history.

(56) References Cited

U.S. PATENT DOCUMENTS

| 5,956,408 A | 9/1999 | Arnold | |
| 8,954,732 B1 * | 2/2015 | Watsen | H04L 63/0823 713/157 |
| 9,912,486 B1 * | 3/2018 | Sharifi Mehr | H04L 9/321 |
| 2003/0065921 A1 * | 4/2003 | Chang | G06F 21/6209 713/175 |
| 2005/0154878 A1 | 7/2005 | Engberg et al. | |
| 2005/0172128 A1 | 8/2005 | Little et al. | |

(Continued)

FOREIGN PATENT DOCUMENTS

| KR | 20170119645 A | 10/2017 |
| WO | 2019/237192 A1 | 12/2019 |

OTHER PUBLICATIONS

Patent Cooperation Treaty, International Search Report for PCT/CA2019/050821, dated Aug. 20, 2019, pp. 1-5.

(Continued)

*Primary Examiner* — Darshan I Dhruv
(74) *Attorney, Agent, or Firm* — Pillsbury Winthrop Shaw Pittman LLP

(57) ABSTRACT

There is provided methods and apparatuses for secure updating of firmware/software. The methods and apparatus can be enabled by making use of the Online Certificate Status Protocol (OCSP) to request the revocation status of certificates in the certificate chain. In particular, a method called 'OCSP stapling' can ensure the validity of the certificates or verify authenticity of the software/firmware. By virtue of features of the OCSP stapling, the user device does not need to contact CAs directly for the purpose of verifying the status of the certificates that ensure authenticity and integrity of the delivered software/firmware and thus is not required to open an extra communication channel to obtain status of certificates. This process can also reduce the burden on CAs because the CAs are neither required to keep a large volume of CRLs nor to maintain connection with user devices for which the CAs are responsible.

24 Claims, 7 Drawing Sheets

(56) References Cited

U.S. PATENT DOCUMENTS

| | | | |
|---|---|---|---|
| 2007/0028120 A1 | 2/2007 | Wysocki et al. | |
| 2007/0038704 A1* | 2/2007 | Brown | H04L 63/102 709/206 |
| 2007/0220259 A1* | 9/2007 | Pavlicic | G06Q 20/389 713/176 |
| 2008/0133906 A1 | 6/2008 | Parkinson et al. | |
| 2008/0133907 A1* | 6/2008 | Parkinson | H04L 63/101 713/158 |
| 2008/0133908 A1* | 6/2008 | Parkinson | H04L 63/0823 713/158 |
| 2008/0172559 A1* | 7/2008 | Yellepeddy | H04L 63/0823 713/158 |
| 2008/0301793 A1* | 12/2008 | Kim | H04L 9/3263 726/10 |
| 2009/0132813 A1* | 5/2009 | Schibuk | G06Q 20/322 713/158 |
| 2010/0058317 A1* | 3/2010 | Braams | G06F 21/572 717/171 |
| 2010/0115269 A1* | 5/2010 | Allen | G06F 21/51 713/157 |
| 2011/0004763 A1* | 1/2011 | Sato | H04L 63/06 713/175 |
| 2011/0072270 A1* | 3/2011 | Little | H04L 63/0823 713/175 |
| 2011/0145568 A1* | 6/2011 | Clement | G06F 21/10 713/156 |
| 2011/0154017 A1* | 6/2011 | Edstrom | H04L 67/2819 713/151 |
| 2014/0109078 A1* | 4/2014 | Lang | G06F 21/57 717/172 |
| 2014/0259004 A1* | 9/2014 | Devarajan | G06F 21/572 717/173 |
| 2014/0289833 A1* | 9/2014 | Briceno | H04L 63/08 726/7 |
| 2015/0067323 A1* | 3/2015 | Salowey | H04L 9/3268 713/155 |
| 2015/0100778 A1* | 4/2015 | Andrews | H04L 63/0823 713/156 |
| 2015/0156024 A1* | 6/2015 | De Los Santos | H04L 9/3268 713/176 |
| 2015/0156194 A1* | 6/2015 | Modi | H04L 9/3268 713/158 |
| 2015/0256345 A1* | 9/2015 | Vaid | H04L 9/3268 713/158 |
| 2015/0372824 A1* | 12/2015 | Himawan | H04L 9/006 713/156 |
| 2017/0208469 A1* | 7/2017 | Mazzuca | H04L 9/3268 |
| 2017/0279619 A1* | 9/2017 | Yang | H04L 9/006 |
| 2018/0041507 A1* | 2/2018 | Sivarajan | H04W 12/0602 |
| 2018/0248702 A1* | 8/2018 | Wu | G06F 21/51 |
| 2018/0294978 A1* | 10/2018 | Camp | H04L 67/02 |
| 2019/0394053 A1* | 12/2019 | Yu | H04L 9/30 |

OTHER PUBLICATIONS

Patent Cooperation Treaty, Written Opinion of the International Searching Authority for PCT/CA2019/050821, dated Aug. 20, 2019, pp. 1-6.

\* cited by examiner

METHOD AND APPARATUS FOR SECURE SOFTWARE UPDATE

FIELD OF THE INVENTION

The present invention pertains to the field of software/firmware security and in particular to a method and apparatus for securely updating software or firmware for a wide range of devices that operate either online or offline.

BACKGROUND

Updating software and firmware is often required for a wide range of devices such as computers, cellular phones and printers. Such software and firmware updates can promote the best performance by adding new features and/or fixing errors. To enjoy newly updated features, it is important to have genuine and trusted software/firmware copies being installed in the desired devices; accordingly, verification of the authenticity and integrity of the software or firmware image can become important.

To ensure authenticity and integrity of the updated software or firmware image, a secure update scheme embracing Public Key Infrastructure (PKI) can be used. Such secure update schemes may embed a public key for verifying the digital signature in a standard signing certificate called X.509 certificate. The signing certificate is included in the updated package which is sent to the desired device. The credential of Root Certificate Authority (CA), the issuer of the signing certificate, is pre-provisioned in the device and is usually provided in the form of a self-signed certificate. When the device receives an update package, it verifies firmware or software against the digital signature in the signing certificate and verifies the signing certificate against the Root CA.

However, there exists one or more potential problems that are often ignored or overlooked with respect to the signing certificate. The issue is that the signing certificate may be revoked by the issuing CA because the private key of the certificate can be compromised.

One of the most frequently used ways to deal with certificate revocation is that the device downloads a Certificate Revocation List (CRL) from the issuing CA, then checks whether the certificate has been revoked by consulting the downloaded CRL. While the device can download the CRL from the Root CA, it can also download the list from a trusted intermediate CA if it is more appropriate. The PKI could be extended to include a hierarchy of Intermediate CAs in which case the CRL would contain the entire certificate chain and the revocation status for each certificate in the chain would need to be checked.

One outstanding problem in this method is that it requires both the device and the CA to be online. Another problem with a CRL is that it can grow without bounds requiring larger download size and more processing (time). Especially in the context of IoT (Internet of Things) devices, the problem may become even worse since each device needs to download its own copy of the CRL. The size of the CRL can be extremely massive; as a result, a huge burden would be placed on the CA server, especially in the cases where the server serves an entire fleet of devices.

Therefore there is a need for a method and apparatus for secure software update that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a method and apparatus for software update. In accordance with an aspect of the present invention, there is provided a method for generating a secure update package for provision to a user equipment (UE). The method includes sending, by an update manager, one or more online certificate status protocol (OCSP) requests to one or more certificate authorities (CA) and receiving, by the update manager, one or more OCSP responses indicating status of one or more certificates. The method further includes generating, by the update manager, the update package including the one or more OCSP responses.

In accordance with an aspect of the present invention, there is provided a method for securely updating software/firmware on a user equipment (UE). The method includes examining the status of one or more certificates using one or more OCSP responses contained in an update package and/or the previously received OCSP responses and storing the most up-to-date OCSP responses for each certificate.

In accordance with another aspect of the present invention, there is provided an update manager for generating a secure update package for provision to a user equipment. The update manager includes a processor and a machine readable memory storing machine executable instructions which when executed by the processor configure the update manager to send one or more online certificate status protocol (OCSP) requests to one or more certificate authorities (CA) and receive one or more OCSP responses indicating status of one or more certificates. The machine executable instructions which when executed by the processor configure the update manager to generate an update package including the one or more OCSP responses.

In accordance with another aspect of the present invention, there is provided a user equipment for securely updating software/firmware thereon. The user equipment includes a processor and a machine readable memory storing machine executable instructions which when executed by the processor configure the user equipment to examine a status of one or more certificates using one or more OCSP responses contained in one or more of an update package and previously received OCSP responses and store most up-to-date OCSP responses for each certificate.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

The present invention provides methods and apparatuses for secure updating of firmware/software. The present invention can enhance securely updating software/firmware such that the user device does not need to be online to verify whether the status of a certificate is good during the update process. The methods and apparatus can be enabled by making use of the Online Certificate Status Protocol (OCSP) instead of a CRL to request the revocation status of all certificates in the certificate chain. In particular, the present invention uses a method called 'OCSP stapling' to ensure the validity of the certificates or verify authenticity of the software/firmware. By virtue of features of the OCSP stapling, the user device does not need to contact CAs directly for the purpose of verifying the status of the certificates that ensure authenticity and integrity of the delivered software/firmware. The user device is not required to open an extra communication channel to obtain information for the status of certificates. Further, the use of OCSP stapling can also advantageous to CAs as the burden imposed on the CAs can be significantly reduced, especially when they serve an entire fleet of user devices at once. The methods and apparatuses of the present invention reduce the burden on CAs because the CAs are neither required to keep a large volume of CRLs nor to maintain connection (e.g. extra communicating channel) with user devices for which the CAs are responsible. The less amount of information contained in the OCSP response also reduces the burdens on the CAs.

Figure 1:
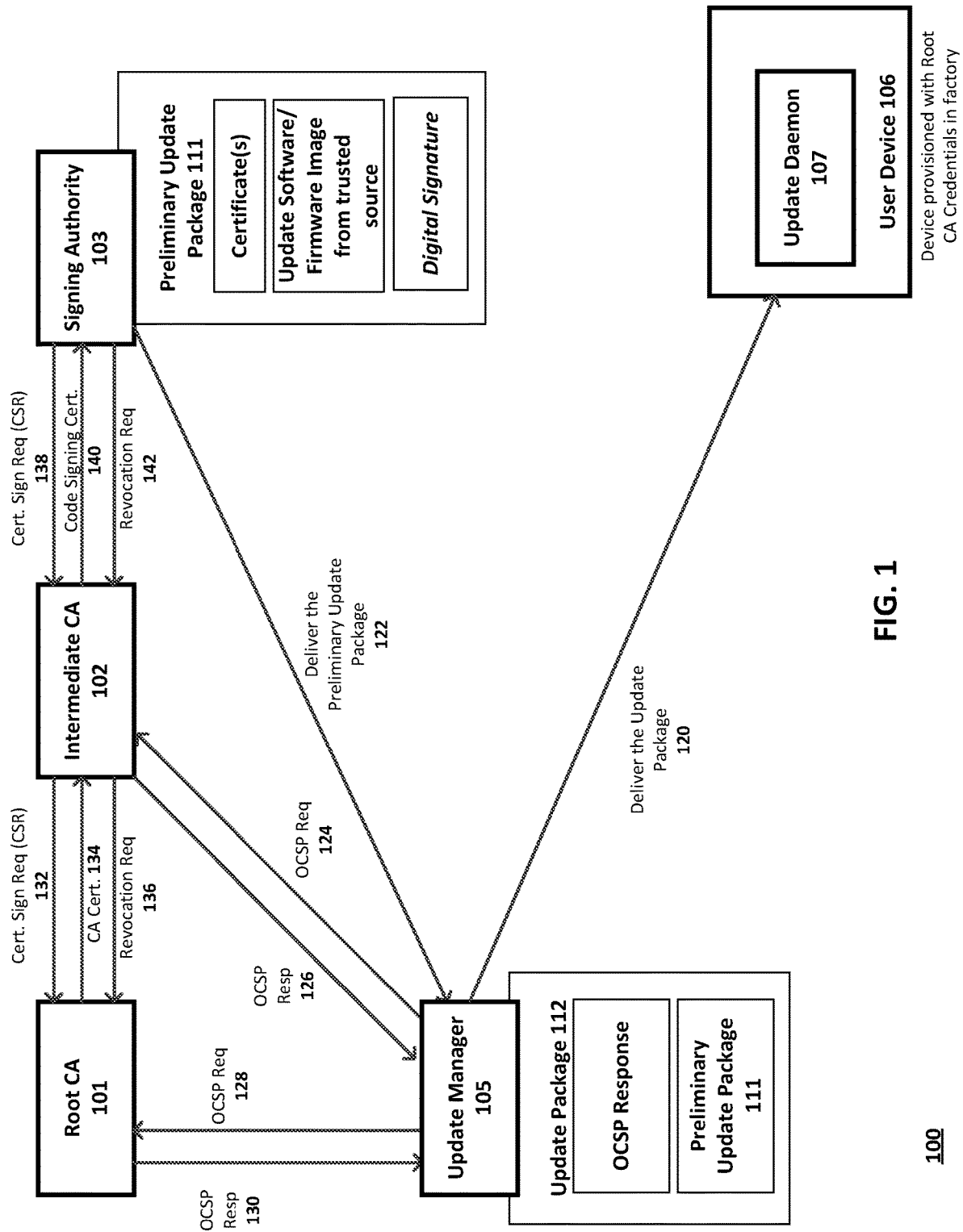
FIG. 1 is a schematic diagram of an overall system for securely updating software/firmware of a user device in accordance with embodiments of the present invention.

FIG. 1 illustrates graphically an overall system 100 for securely updating software/firmware of a user device in accordance with embodiments of the present invention.

The entity 101 is a Root CA, a trusted authority that publishes a root certificate. A root certificate ensures the identity of the root CA 101 and also verifies identity of a software/firmware publisher and/or authenticity of certificates of other certificate authorities (e.g. intermediate CAs). In general, root certificates are self-signed and trusted by most major operating systems. Similarly in embodiments of the invention, the root certificate issued by the root CA 101 is self-signed and is trusted by the user device 106.

In order to enhance the security of the software/firmware update mechanism, the present invention may include more than one CA as illustrated in the figure. The entity 102 is an intermediate CA that is connected to the root CA 101 through and an intermediate CA certificate issued and signed by the root CA 101. In other words, the intermediate CA 102 is trusted by the root CA 101. The intermediate CA 102 issues end-entity certificates (e.g. code signing certificates) and acts as a proxy of the root CA 101. While FIG. 1 illustrates that there is one root CA and one intermediate CA, the present invention includes secure software/firmware update mechanisms with more than one intermediate CA between the root CA 101 and the signing authority 103. In such cases, the root certificate issued by the root CA 101 will be protected by several layers of security.

The intermediate CA 102 is communicatively connected to the signing authority 103. The signing authority 103 has power to sign the publishing software/firmware using the code signing certificate provided by the intermediate CA 102. The signing authority 103 uses the code signing certificate as a digital signature. In some embodiments, the signing authority 103 is also operating as a vendor that publishes the updating software/firmware.

According to embodiments of the present invention, the user device 106 is pre-provisioned with the all credentials for the root CA (in factory), as illustrated in the figure. All of the credentials are required to be trusted by the manufacturer before being provisioned in the user device 106. Once the root CA 101 is trusted and approved by the manufacturer of the device 106, certificates trusted by the root CA 101 can be also safely trusted by the user device 106 and do not need additional verification processes. This aspect indicates that the root CA 101 acts as a trust anchor and needs to be highly protected, thus access to the root CA 101 may be somewhat restricted. In some embodiments, the root CA is online only when it issues certificates for other certificate authorities (e.g. the intermediate CA 102) in order to minimize chances of being exposed to attacks from malicious entities.

According to embodiments of the present invention, the intermediate CA 102 needs to be trusted through extra verification steps since the user device 106 has no pre-provisioned credentials for the certificate of the intermediate CA 102, unlike the root certificate issued by the root CA 101, thus, no trust is initially assigned to the intermediate certificate. To overcome this, a logical trust link between the intermediate CA 102 and the root CA 101 can be established. To establish the trust link, the intermediate CA 102 sends 132 a certificate signing request to the root CA 101 in order to obtain an intermediate CA certificate that assures identity and trustworthiness of the intermediate CA 102. Upon receipt of the certificate signing request from the intermediate CA 102, the root CA 101 checks the identity of intermediate CA 102 and its trustworthiness. Once the verification process is complete, the root CA 101 will sign and issue 134 an intermediate CA certificate to the intermediate CA 102. As a result, the trust link between the root CA 101 and the intermediate CA 102 is established and the intermediate CA 102 is now entitled to act as a proxy of the root CA 101. The intermediate CA certificate issued to the intermediate CA 102 inherits the trust of the root CA 101.

According to embodiments of the present invention, the signing authority 103 also needs to be trusted. Similar to the above, the signing authority 103 sends 138 a certificate signing request to the intermediate CA 102 to obtain a code signing certificate that will assure the identity of the software/firmware publisher and ensures that the software/firmware to be published is not altered or tampered with since it was digitally signed. Upon receipt of the certificate signing request from the signing authority 103, the intermediate CA 102 checks the identity of signing authority 103 and its trustworthiness. Once the verification process is complete, the intermediate CA 102 will sign and issue 140 a code signing certificate to the signing authority 103. Thus, the trust link between the intermediate CA 102 and the signing authority 103 is established.

According to embodiments of the present invention, once the signing authority 103 is trusted through the established trust links, the signing authority 103 can generate a digital signature for the updated software/firmware using original source code of the software/firmware and credentials in the code signing certificate issued to the signing authority 103. Since this digital signature is generated using the original source code of the software/firmware, change of the source code creates a different digital signature. This means a valid digital signature assures that the source code has not been altered or tampered with since the source code was digitally signed.

When the source code of the update software/firmware is digitally signed, the signing authority 103 becomes ready to prepare a preliminary update package that will be delivered to the update manager 105. According to some embodiments of the present invention, the signing authority 103 constructs the preliminary update package 111 that contains the intermediate CA certificate issued to the intermediate CA 102, the code signing certificate issued to the signing authority 103, the update software/firmware to be published and the signing authority's digital signature attached on the software/firmware. In some other embodiments, there can be a separate entity that constructs the preliminary update package 111 and delivers it to the entity that distributes the complete update package.

When the preliminary update package 111 is packed completely, the package will be delivered 122 to an entity that will distribute the complete update package (e.g. the update package 112) to user devices. When there are more than one intermediate CAs between the root CA 101 and the signing authority 103, the preliminary update package 111 can include all the intermediate CA certificates issued to each intermediate CA.

Although the authenticity and integrity of the update software/firmware can be assured by one or more of intermediate CA certificates and the code signing certificate, this does not completely remove all security concerns when updating software/firmware. At various times, the intermediate certificates and the code signing certificate can be compromised for various reasons (e.g. the CA is subverted by the attack from the malicious party). If any certificate that assures the authenticity and integrity of the updating software/firmware is not credible, then the updated software/firmware cannot be trusted either, as assurance of the certificate can no longer be trusted. Therefore, it is also important to verify whether all of the intermediate CA certificates and the code signing certificate are valid and in a good status. While the status of certificates can be checked using the Certificate Revocation List (CRL), the present invention does not use the CRL due to a number of issues discussed above. Instead, the present invention checks the status of various certificates using the OCSP stapling technique.

According to embodiments of the present invention, the update manager 105, as shown in FIG. 1, is added to facilitate various aspects of the OCSP stapling technique being more effectively engaged in the certificate status verification process.

According to embodiments of the present invention, the update manager 105 is communicatively connected to the Root CA 101 and the Intermediate CA 102, as illustrated in FIG. 1. One of the main responsibilities of the update manager 105 is to obtain OCSP responses from all the CAs within the chain of trust that assures authenticity and integrity of the update software/firmware (including the Root CA 101 or the Intermediate CA 102). The update manager 105 obtains OCSP responses, before constructing an update package, to make the user device 106 check the validity or status of certificates in the preliminary package. To obtain the OCSP responses, the update manager 105 sends 124/128 OCSP requests to each aforementioned CA through the communicative connections between each CA and the update manager 105. Upon receipt of the OCSP request, each CA, as an OCSP responder, will check the status of the certificate requested by the update manager 105 then send 126/130 OCSP responses back to the update manager 105.

If there are two or more intermediate CAs, the update manager 105 obtains OCSP responses from all intermediate CAs since status of all the certificates issued by all intermediate CAs will be included in the update package 112 as well. (Status of all certificates needs to be verified as only valid certificates can assure the authenticity and integrity of the software/firmware.) However, the OCSP response for the root CA certificate may not need to be obtained because the root CA will not be included in the update package 112 because the user device 106 is already pre-provisioned (in factory) with the root CA credentials required for verification of the intermediate CA certificates. The credentials of Root CA are usually provided in the form of a self-signed certificate.

According to embodiments of the present invention, the update manager 105 is also responsible for constructing the update package 112. The update package 112 comprises the preliminary update package 111 and the OCSP responses received from the root CA 101 and the intermediate CA 102. If there are two or more intermediate CAs, there will be more OCSP responses from other intermediate CAs. OCSP responses for all intermediate CA certificates will be included in the update package 112 when the update manager 105 constructs the update package 112. However, the OCSP response for the root CA certificate may not need to be included in the update package 112 since status of the root CA certificate may not need to be verified at the user device 106. All root CA credentials are pre-provisioned at the user device 106 thus status verification for root CA certificate may not be required.

Once constructing the update package 112 is complete, the update package will be delivered 120 to the user device 106. According to embodiments of the present invention, the update package can be delivered via a variety of methods. The method of delivering the update package is not limited.

When the update package 112 is delivered to the user device 106, the user device 106 can start software/firmware update process. In some embodiments of the present invention, there may be a background process such as the update daemon 107 to facilitate the secure software/firmware update process. As the update daemon 107 is a background process, a user may be able to use the user device 106 while the software/firmware update is occurring.

According to embodiments of the present invention, the software/firmware update will be processed only when all the certificates contained in the update package 112 assures the identity of the software/firmware publisher and ensures that the software/firmware to be published is not altered or tampered with. Furthermore, these certificates are in good standing; otherwise, the authenticity and integrity of the software/firmware cannot be assured by the certificates since the certificates themselves are not credible. Whether the certificates are in a good standing and still trustworthy will be verified using the OCSP responses stapled in the update package 112. As a result, the user device 106 can be convinced that the software/firmware in the update package 112 is authentic and maintained its integrity without directly contacting CAs. This implies that the burden on the CAs is vastly reduced especially in the case where there is a fleet of thousands of user devices that need software/firmware updates.

The present invention carries another advantageous feature in secure software/firmware update processes. According to embodiments of the present invention, a time period of validity of a certificate can be flexibly determined by CAs. CAs can notify the user device of the validity time window using one or more fields in the OCSP response (e.g. 'thisUpdate' and 'nextUpdate') and determine the validity time window of each OCSP response as it sees fit at the time each OCSP response is constructed. There is no need for user devices to hard code the validity window of the OCSP response.

Figure 2:
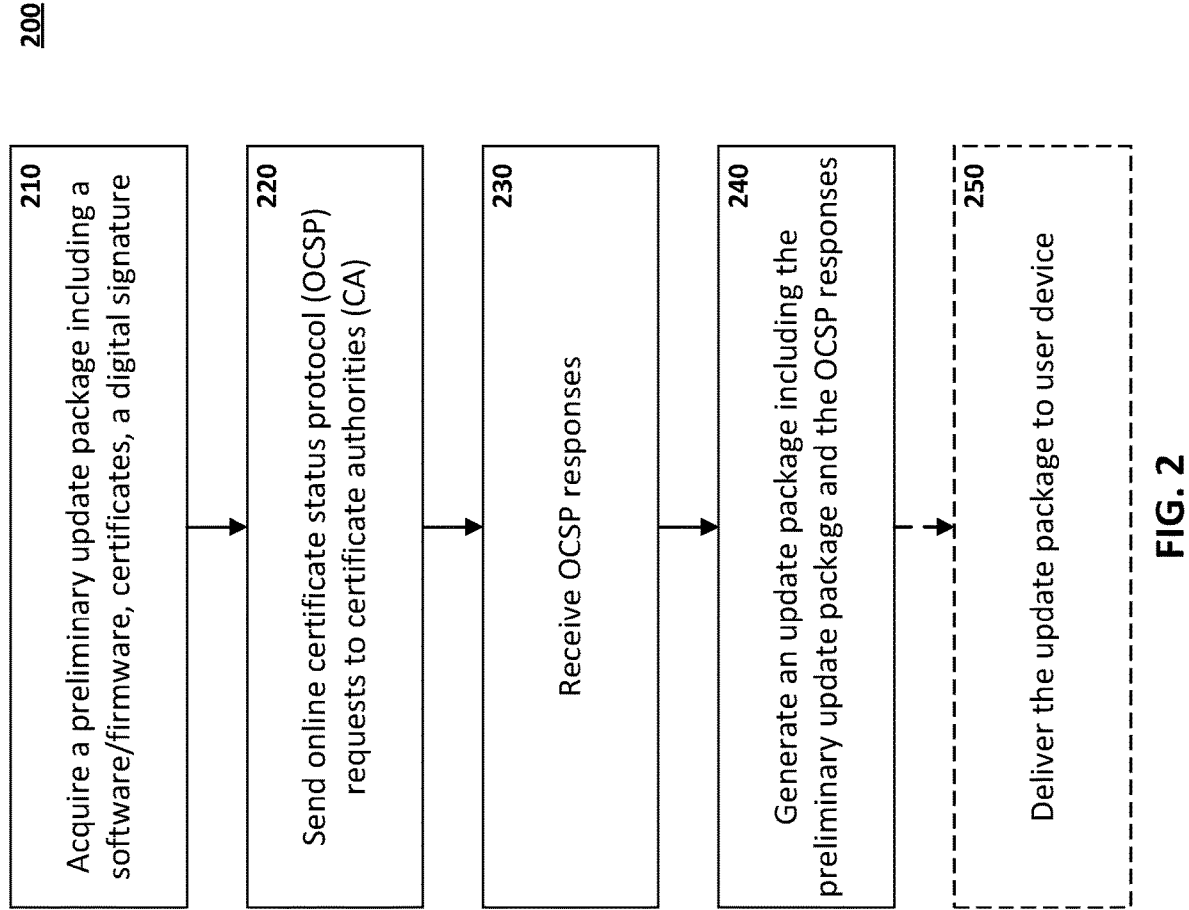
FIG. 2 is a flow diagram illustrating a method by an update manager for generating an update package for provision to a user device in accordance with embodiments of the present invention.

FIG. 2 illustrates the method 200, a method for generating an update package for provision to a user device by an update manager in accordance with embodiments of the present invention. According to embodiments of the present invention, the preliminary package 111 contains one or more certificates that assure authenticity and integrity of the update software/firmware and the software/firmware with digital signature that will be provided to user devices. When a preliminary package 111 is packed completely, the update manager 105 acquires the preliminary package to build or generate the update package 112 that will be distributed to user devices for secure update. The update package 112 can have OCSP responses stapled in it. The stapled OCSP responses will be used for assuring the validity of the certificates included in the preliminary package 111 wherein the certificates will be used for verification for authenticity and integrity of the update software/firmware. Thus, the update manager 105 should obtain the OCSP responses before constructing the update package.

According to embodiments of the present invention, to obtain the OCSP responses, the update manager 105 sends OCSP requests to each CA that issued certificates in the preliminary package 111. In some embodiments, the OCSP requests will be made through the communicative connections between CAs and the update manager 105. When sending the OCSP request, the update manager 105 may need to specify a particular certificate that it wants to verify the status. This is because the root CA 101 and the intermediate CA 102 may have issued more than one certificate. Upon receipt of the OCSP request, each CA, as an OCSP responder, will check the status of the certificate requested by the update manager 105 and prepare an OCSP response that contains the status of the certificate.

In some embodiments, the update manager 105 does not send OCSP requests to every single CA that issued certificates included in the preliminary package 111. Using the communicative links between each CA, the CA in a lower level of the trust chain hierarchy may retrieve information equivalent to OCSP response(s) from (other) CAs in a higher level of the trust chain hierarchy, up to the Root CA. For example, referring to FIG. 1, the update manager 105 may send an OCSP request only to the intermediate CA 102. When the intermediate CA 102 receives the OCSP request from the update manager 105, it returns the update manager 105 not only the OCSP response for the certificate it issued (i.e. code signing certificate in FIG. 1) but also the OCSP response for the root CA 101 issued (i.e. CA certificate in FIG. 1).

According to embodiments of the present invention, the update manager 105 may obtain OCSP responses from the CAs on a regular basis or randomly upon occurrence of emergency. In some case, the update manager 105 may obtain OCSP responses just before releasing the update package 112. When the update manager 105 obtains the OCSP responses, it may cache the received OCSP responses or save the OCSP responses in its own repository. The cached or saved OCSP responses will be included in the update package 112 prepared by the update manager 105.

According to embodiments of the present invention, each CA has power to sign the OCSP response for the certificate that it issued and the OCSP responses are signed by the responding CAs. As a result, the user device 106 can trust the authenticity of the OCSP responses that the update manager 105 obtained. This is because the user device 106 trusts all CAs directly or indirectly through the chain of trust.

In some embodiments, the CA that signs the OCSP response for the OCSP response's authenticity is not the entity (i.e. CA) that issued the certificate. The CA that issued the certificate may delegate its peer CA(s) to have power to sign the OCSP response.

According to some embodiments of the present invention, each CA is able to determine the validity time window of the OCSP responses by using the 'thisUpdate' and 'nextUpdate' fields in the OCSP response. The 'thisUpdate' may represent the time that the OCSP response was issued or the time that the OCSP responder (e.g. the CA that responds to the OCSP request) collected information regarding the status of the certificate's validity. The 'nextUpdate' may represent the time that the OCSP response needs to be updated with new certificate status. The 'nextUpdate' could be used and understood as an expiration time of the OCSP response. As the CA can notify the user device 106 of the validity time window using the 'thisUpdate' and 'nextUpdate' fields in the OCSP response, the CA can determine the validity time window of each OCSP response as it sees fit at the time each OCSP response is constructed. There is no need for the user device 106 to hard code the validity window of the OCSP response. Each OCSP response does not need to have the same validity time window.

While the method 200 in FIG. 2 only demonstrates that acquiring 210 a preliminary update package occurs before obtaining OCSP responses (i.e. sending 220 OCSP requests and receiving 230 OCSP responses), the order of operating the two tasks (i.e. 'acquiring the preliminary update package' and 'obtaining OCSP responses') can be reversed. Any of the two tasks can be performed first; however, the two tasks should be completed before the update manager 105 constructs the update package 112.

When the preliminary package 111 and all OCSP responses that verify the validity of all the certificates included in the preliminary package 111 are ready, the update manager 105 will generate 240 the update package 112. The update package 112 contains the preliminary package 111 and the OCSP responses aforementioned. The method of constructing the update package 112 can be various and not limited. Moreover, the type or format of the update package 112 or even any contents (e.g. files) in the update package 112 can be various and not limited. For example, the constructed update package may be a software package, wherein the software package includes one or more software files or even parts of the software files. The software files may be a software program or an electronic file that can be operated by another computer program. The software may be compressed or may be encoded.

According to embodiments of the present invention, once the update package 112 is generated completely, the update package 112 will be delivered 250 to the user device 106. According to embodiments of the present invention, the update package 112 can be delivered via a variety of methods. The method of delivering the update package is not limited. In some instances, the update package 112 can be delivered through TCP connections. In some other instances, the update package 112 can be delivered through e-mail. In some other instances, the update package 112 can be delivered even if the user device 106 is not communicatively connected to the update manager 105 (i.e. when the user device 106 is offline). For example, the update package 112 can be delivered to the user device through a USB stick.

Figure 3:
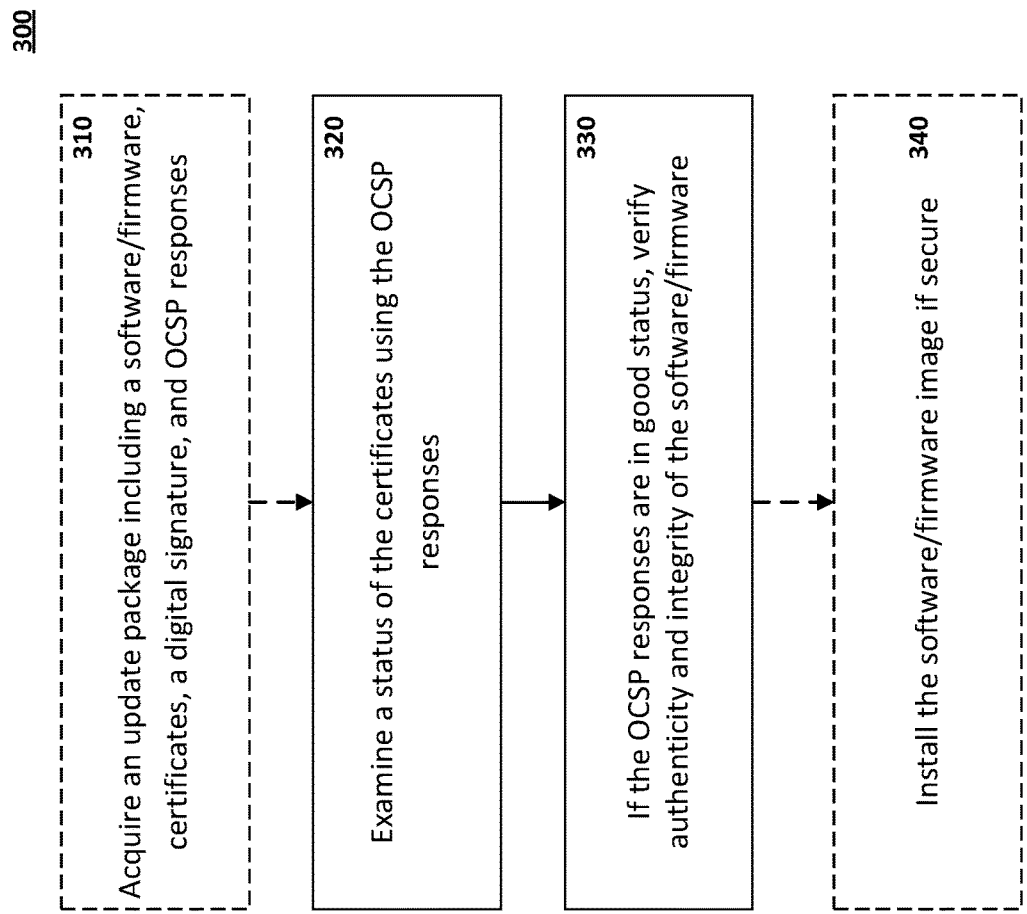
FIG. 3 is a flow diagram illustrating a method by a user device for securely updating software/firmware on the user device in accordance with embodiments of the present invention.

FIG. 3 illustrates the method 300, a method for securely updating software/firmware on a user device by the user device in accordance with embodiments of the present invention. According to embodiments of the present invention, initially, the user device 106 acquires 310 the update package 112 containing OCSP responses, (one or more) certificates and the update software/firmware with digital signature. The OCSP responses verify the validity of the certificates and the certificates verify authenticity and integrity of the update software/firmware. Since the method of delivering the update package is not limited, as stated above, the acquisition of the update package 112 can be accomplished regardless of online connectivity of the user device 106. In other words, the user device 106 can acquire the update package 112 even when the user device 106 is offline.

According to embodiments of the present invention, once the user device 106 acquires the update 112, it examines 320 the status of certificates using the OCSP responses stapled in the update package 112. The status of the certificate can be examined even if the user device 106 is offline because the update package 112 contains all the information, including the OCSP response, required to check the authenticity and integrity of the software/firmware. The OCSP response includes identifier for the certificate, the (revocation) status of the certificate, the validity time window of the OCSP response and optional information.

If validity or status of all the certificates included in the update package 112 is verified and the certificates are all in good status, the user device 106 can verify 330 the authenticity and integrity of the update software/firmware to be used in the secure update process.

Authenticity and integrity of the update software/firmware can be verified even if the user device 106 is offline because the update package 112 contains all the information required to check the authenticity and integrity of the software/firmware (e.g. one or more certificates). Moreover, in at least some embodiments of the present invention, the user device 106 is pre-provisioned with the root CA credentials which are required for verification of one or more certificates included in the update package 112.

While the method 300 in FIG. 3 only demonstrates that examining status of certificates using OCSP responses is performed before determining authenticity and integrity of the update software/firmware, the order of operating the two tasks (i.e. 'examining status of certificates' and 'determining authenticity and integrity') can be reversed. Any of the two tasks can be performed first; however, it may be preferred to examine status of certificates using OCSP responses first for the purpose of efficiency. If the status of any one of the certificates is not in good status, then there may be no value to verifying authenticity and integrity of the update software/firmware because at least one of the certificates cannot be trusted. Authenticity or integrity of the update software/firmware cannot be properly verified when the verification is performed using one or more certificates that are not in good status (e.g. the certificate is compromised).

However, it is important to note that both examining status of certificates and determining authenticity and integrity of the update software/firmware is appropriately performed.

Once all the verification processes elaborated above are complete and the outcome of the verification processes assures authenticity and integrity of the update software/firmware (e.g. the update software/firmware is appropriately verified by certificates that are in good status and the good status of all the certificates are assured by the OCSP responses contained in the update package 112), the user device 106 is now ready to further proceed with the software/firmware update process (e.g. install 340 the update software/firmware if secure). In some embodiments, the user device 106 installs the update software/firmware using a pre-installed software installation program that is designated for this particular updated software/firmware.

In some embodiments of the present invention, there may be a background process such as the update daemon 107 to facilitate the secure software/firmware update process. As the update daemon 107 is a background process, a user may be able to use the user device 106 while the software/firmware update is occurring.

As previously discussed, certificates (e.g. intermediate CA certificates or code signing certificates) can be revoked by the issuing CAs (e.g. the root CA 101 and the intermediate CA 102). There are a number of reasons that the CAs want to revoke the certificate. For instance, (the private key of) the intermediate certificate or the code signing certificate can be compromised. When such event occurs, the relevant CA (e.g. CA that has authority to revoke the certificate) will revoke the compromised certificate as soon as it became aware that the certificate has been compromised. In some instances, an entity that requested the code signing certificate (e.g. the signing authority 103 in FIG. 1) may make a revocation request 142 for the compromised certificate. In some instances, an intermediate CA may make a revocation request 136 to the other CA that issued the CA certificate (e.g. root CA 101 or other intermediate CA in a higher position of the trust chain in FIG. 1) for the compromised certificate.

Figure 4:
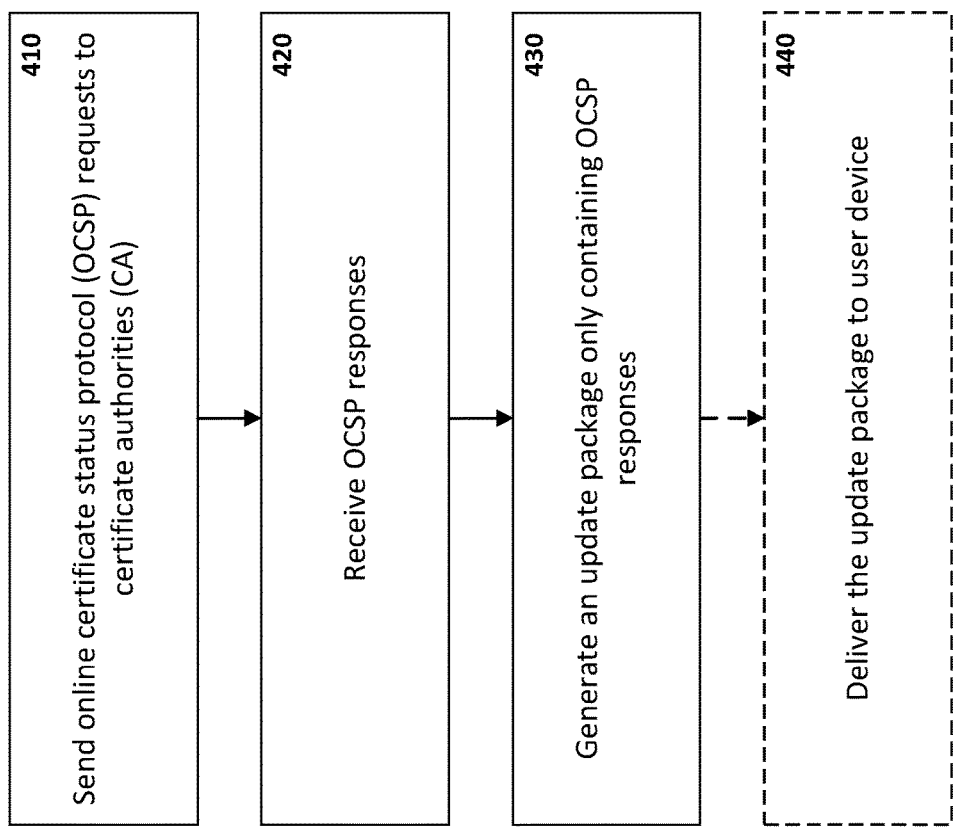
FIG. 4 is a flow diagram illustrating a method by an update manager for generating an update package to provide a user device for certificate status update in accordance with embodiments of the present invention.

The present invention also provides an effective method to handle certificates that actually have been revoked. FIG. 4 illustrates the method 400, a method for generating an update package for certificate status update to provide a user device by an update manager in accordance with embodiments of the present invention.

First, the update manager 105 sends 410 an OCSP request to certificate authorities (CAs) to find out whether any certificates have been revoked by the issuing CAs. When the update manager 105 sends an OCSP request to either the Root CA or one of the Intermediate CAs, the update manager, in response, receives 420 an OCSP response from the CA that receives the OCSP request. The received OCSP response contains information that indicates the issued certificate has been revoked, for example using 'CertStatus' field, 'RevokedInfo' field or other fields that can show the revoked status of the certificate.

Upon obtaining OCSP responses from one or more CAs (or OCSP responders), the update manager 105 prepares to generate the update package 112. However, the update package 112 in this case will be different from the update package 112 previously described. When the status of the certificate has been revoked, the update manager 105 should not be required to build up or generate a complete update package. Even if a complete update package is built including an updated software/firmware that is to be installed in a user device, the user device 106 will not install the software/firmware in the update package because there is no valid or trusted certificate that has a good status. In other words, when any of the certificates in the complete update package 112 has been revoked, the update software/firmware will not be installed in the user device 106 even if the software/firmware is delivered because the authenticity of the software/firmware cannot be assured.

However, even if the user device 106 never installs any software/firmware without a valid and trustworthy certificate, it is still important to promptly notify the user device 106 that one or more of the issued certificates have been revoked. The user device 106 may contain previously issued and signed OCSP responses that indicate the certificates are in a good standing. These OCSP responses may have a validity window that will expire sometime in the future. Since the user device 106 is informed about the status of certificates (only) through the OCSP response attached to the update package (e.g. the update package 112), the user device 106 will not be able to know that the certificate has been revoked if it does not receive the update package 112. This means, even if the certificates are in fact revoked by the issuing CAs, the user device 106 will not change the certificate status until it receives a new update package from the update manager 105 or the OCSP responses expire. This situation allows hackers to craft malicious code digitally signed with the compromised certificate key and attach the OCSP responses indicating the certificate, which is actually compromised, is in a good standing.

To mitigate this, the update manager 105 generates 430 an update package that only comprises one or more OCSP responses. Each OCSP response includes identifier for the certificate, the (revocation) status of the certificate, the validity time window of the OCSP response and optional information.

This aspect of the present invention allows the update manager 105 to reduce the possibility of the user device 106 being damaged by a malicious hacker's attack. The user device 106 will be informed by the update manager 105 that the certificates have been revoked before the hacker's attempt to attack the user device 106.

Another beneficial feature of the present invention is that it can address the duration that the user device 106 needs to store the OCSP responses when the OCSP responses indicate certificates have been revoked. As discussed earlier, the certificates can be revoked for several reasons including that (the private key of) the intermediate certificate or the code signing certificate is compromised.

According to embodiments of the present invention, when the CA revokes a certificate that it previously issued, it can construct and provide the OCSP response indicating that the certificate has been revoked. The CA can also ensure that the 'nextUpdate' value contained in the revoked OCSP response is beyond (i.e. further into the future than) any previously created OCSP responses that have a 'good' status. This requirement allows the user device 106 to safely delete stored OCSP responses with a 'revoked' status after their validity time window expires.

According to embodiments of the present invention, each CA has power to sign the OCSP response for the certificate that it issued and the OCSP responses are signed by the responding CAs. As a result, the user device 106 can trust the authenticity of the OCSP responses that the update manager 105 obtained because the user device 106 trusts all CAs directly or indirectly through the chain of trust. In some embodiments, the CA that signs the OCSP response for the OCSP response's authenticity is not the entity (i.e. CA) that issued the certificate. The CA that issued the certificate may delegate its power to sign the OCSP response to its peer CA(s).

According to some embodiments of the present invention, each CA is able to determine the validity time window of the OCSP responses by using the 'thisUpdate' and 'nextUpdate' fields in the OCSP response. The 'thisUpdate' may represent the time that the OCSP response was issued or the time that the OCSP responder (e.g. the CA that responds to the OCSP request) collected information regarding the status of the certificate's validity. The 'nextUpdate' may represent the time that the OCSP response needs to be updated with new certificate status. The 'nextUpdate' could be used and understood as an expiration time of the OCSP response. As the CA can notify the user device 106 of the validity time window using the 'thisUpdate' and 'nextUpdate' fields in the OCSP response, the CA can determine the validity time window of each OCSP response as it sees fit at the time each OCSP response is constructed. There is no need for the user device 106 to hard code the validity window of the OCSP response. Each OCSP response does not need to have same validity time window.

According to embodiments of the present invention, once the update package 112 is generated completely, the update package which only contains one or more OCSP responses will be delivered 440 to the user device 106. According to embodiments of the present invention, the update package 112 can be delivered via a variety of methods. The method of delivering the update package is not limited. In some instances, the update package 112 can be delivered through TCP connections. In some other instances, the update package 112 can be delivered through e-mail. In some other instances, the update package 112 can be delivered even if the user device 106 is not communicatively connected to the update manager 105. For example the update package 112 can be delivered to the user device through a USB stick.

Figure 5:
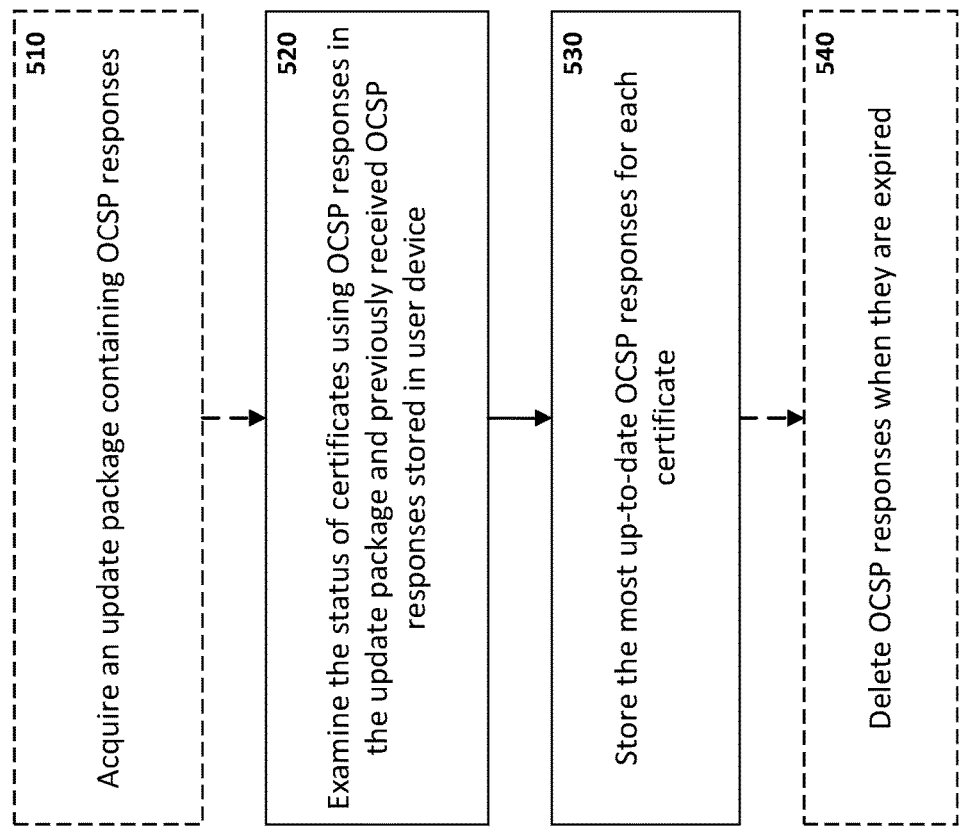
FIG. 5 is a flow diagram illustrating a method by a user device for updating status of a certificate at the user device for certificate status update in accordance with embodiments of the present invention.

FIG. 5 illustrates the method 500, a method for updating status of the certificate at a user device in accordance with embodiments of the present invention. According to embodiments of the present invention, the user device 106 first acquires 510 the update package 112 that only contains one or more OCSP responses. The OCSP responses verify the validity of the certificates and the certificates verify authenticity and integrity of the update software/firmware. Since the method of delivering the update package is not limited, as discussed above, the acquisition of the update package 112 can be accomplished regardless of online connectivity of the user device 106. In other words, the user device 106 can acquire the update package 112 even when the user device 106 is offline.

According to embodiments of the present invention, upon receiving the update package that only contains the OCSP responses, the user device 106 becomes aware of the (revocation) status of each certificate. Once the user device 106 receives the update package 112 from the update manager 105, the user device 106 examines 520 the status of the one or more certificates using one or more OCSP responses contained in an update package 112 and/or the previously received OCSP responses. In other words, the user device 106 cross-checks status of each certificate retrieved from the OCSP responses against status of each certificate retrieved from the previously received OCSP responses. According to embodiments of the present invention, the OCSP responses will be provided whenever a new update package 112 is delivered to the user device 106 whether or not the update package is a complete update package. The user device 106 will store 530 the OCSP responses for each certificate until the OCSP responses expire or more recent OCSP responses are provided. The duration that the user device 106 needs to store the OCSP response may be more important when the OCSP response has 'revoked' status for certificates. When the OCSP responses are expired, the user device 106 may delete 540 the expired OCSP responses. Paragraphs illustrating FIG. 6 provides more explanation about this below.

According to embodiments of the present invention, the status of the certificate can be examined even if the user device 106 is offline because all the information required to examine the (current) status of the certificates are included in the OCSP response. The OCSP response includes the identifier for the certificate, the (revocation) status of the certificate, the validity time window of the OCSP response and optional information.

According to some embodiments of the present invention, there may be a background process such as the update daemon 107 to facilitate certificate status update process at the user device 106. As the update daemon 107 is a background process, a user may be able to use the user device 106 while the software/firmware update is occurring.

Figure 6:
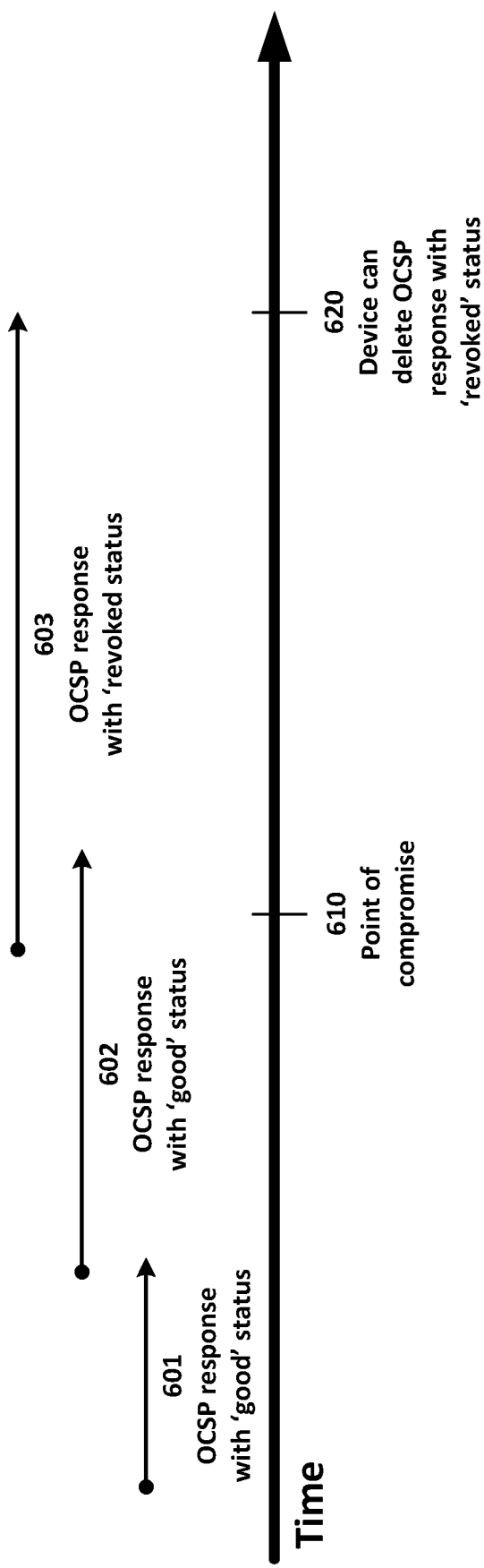
FIG. 6 is a time graph that illustrates the validity timeline for various OCSP responses with certificate status.

The time graph FIG. 6 describes the validity timeline for various OCSP responses with certificate status. Each time arrow shows the time validity window of each OCSP response. The length of each arrow represents the life span of each OCSP response. The exact life span of each OCSP response can be known by calculating the difference between the value of 'thisUpdate' field and the value 'nextUpdate' field. The 'thisUpdate' may represent the time that the OCSP response was issued or the time that the OCSP responder (e.g. the CA that responds to the OCSP request) collected information regarding the status of the certificate's validity. The 'nextUpdate' may represent the time that the OCSP response needs to be updated with the new certificate status. The 'thisUpdate' is marked as the tail of each arrow and the 'nextUpdate' is marked as the head of each arrow.

The time arrows 601, 602 and 603 represent three OCSP responses, the OCSP responses 1, 2 and 3, respectively. The tails of time arrows 601, 602 and 603 are the 'thisUpdate' for the OCSP responses 1, 2 and 3; and the heads of the time arrows 601, 602 and 603 are the 'nextUpdate' for the OCSP responses 1, 2 and 3, respectively.

The time 610 represents the time the certificate is compromised so that the use of the activated certificate is no longer safe. The time 620 represents the time that a user device can delete the OCSP response that has the 'revoked' status. The time 620 is in line with the head of the time arrow 603 which represents the 'nextUpdate' value of the OCSP response 3. This means the user device can delete the OCSP response 3, which has the 'revoked' status, at the time represented by the 'nextUpdate' value contained in the OCSP response 3.

According to embodiments of the present invention, the 'nextUpdate' value contained in the revoked OCSP response is beyond (i.e. further into the future than) any previously created OCSP responses that have a 'good' status. FIG. 6 corresponds with this feature as the head of the time arrow 603 is placed beyond (i.e. further into the future than) the heads of the time arrows 601 and 602. This indicates that the OCSP response 3, the revoked status, has the 'nextUpdate' value beyond the 'nextUpdate' value of the two previously created OCSP responses (i.e. the OCSP responses 1 and 2). As a result, the user device can safely delete the OCSP response 3 when the OCSP response expires (i.e. at the time 620).

Figure 7:
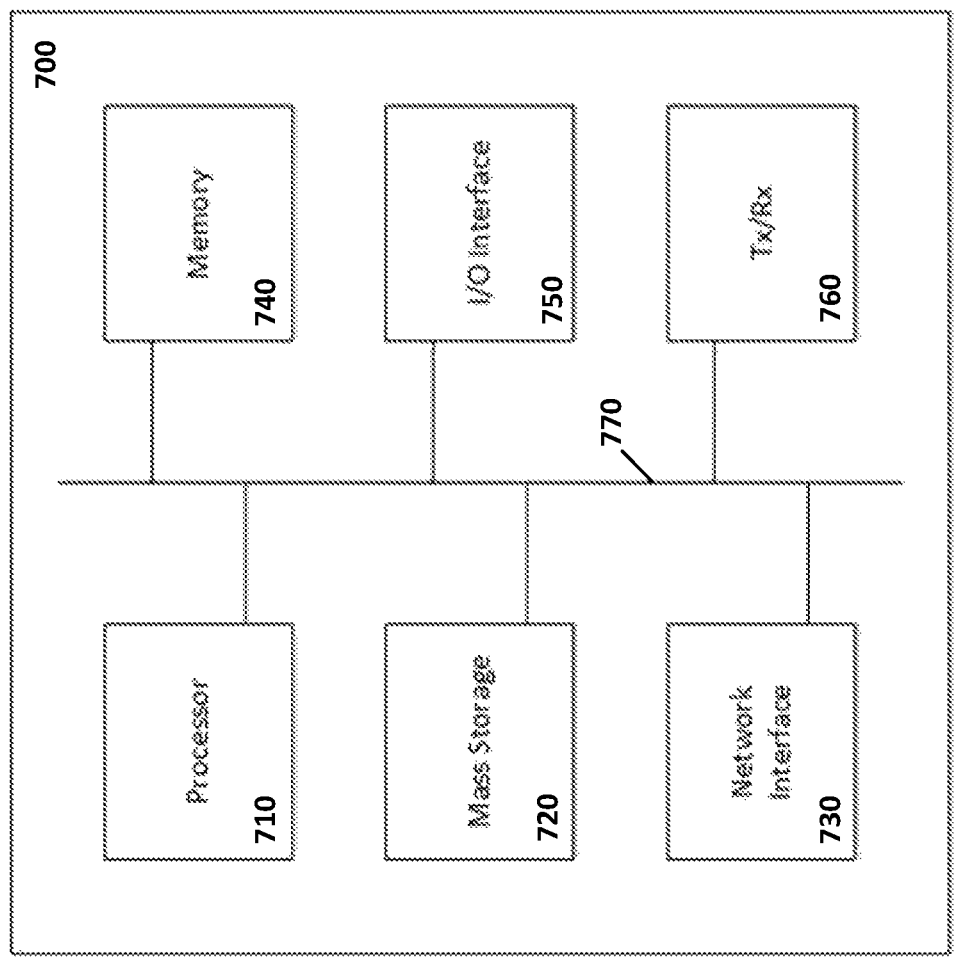
FIG. 7 is a schematic diagram of a hardware device in accordance with embodiments of the present invention.

FIG. 7 is a schematic diagram of an electronic device 700 that may perform any or all of steps of the above methods and features described herein, according to embodiments of the present invention.

In some embodiments, the electronic device may be a certificate vendor, such as the root CA 101 or the intermediate CA 102. In some other embodiments, the electronic device may be the signing authority 103 or an entity that publishes and/or distributes a secure software/firmware update bundle (e.g. a bundle comprising a digitally signed software/firmware and a code signing certificate). In some other embodiments, electronic device 700 may be an OCSP responder, such as a root CA or an intermediate CA. In some other embodiments, the electronic device may be the update manager 105. In other embodiments, the electronic device may be a device that logically connects to the update manager 105 through a radio interface or some other offline medium (e.g. USB stick). Some of such devices are a mobile phone, smart phone or other device that may be classified as a user device. In some embodiments, the electronic device may be a Machine Type Communications (MTC) device (also referred to as a machine-to-machine (m2m) device), or another such device that may be categorized as a user device despite not providing a direct service to a user. In some references, an electronic device may also be referred to as a mobile device, a term intended to reflect devices that connect to a mobile network, regardless of whether the device itself is designed for, or capable of, mobility. In some instances, a user device may be a mobile device. Specific devices may utilize all of the components shown or only a subset of the components, and levels of integration may vary from device to device. Furthermore, a device may contain multiple instances of a component, such as multiple processors, memories, transmitters, receivers, etc.

As shown, the device includes a processor 710, memory 740, non-transitory mass storage 720, I/O interface 750, network interface 730, and a transceiver 760, all of which are communicatively coupled via a bi-directional bus 770. According to certain embodiments, any or all of the depicted elements may be utilized, or only a subset of the elements. Further, device may contain multiple instances of certain elements, such as multiple processors, memories, or transceivers. Also, elements of the hardware device may be directly coupled to other elements without the bi-directional bus.

The memory 740 may include any type of non-transitory memory such as static random access memory (SRAM), dynamic random access memory (DRAM), synchronous DRAM (SDRAM), read-only memory (ROM), or combination of such, or the like. The mass storage element 720 may include any type of non-transitory storage device, such as a solid state drive, hard disk drive, a magnetic disk drive, an optical disk drive, USB drive, or any computer program product configured to store data and machine executable program code. According to certain embodiments, the memory 740 or mass storage 720 may have recorded thereon statements and instructions executable by the processor 710 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the scope of the invention, and all such modifications as would be obvious to one skilled in the art are intended to be included within the scope of the following claims.

I claim:

1. A method for generating a secure update package for provision to a user equipment (UE); the method comprising:
   sending, by an update manager, one or more online certificate status protocol (OCSP) requests to one or more certificate authorities (CA);
   receiving, by the update manager, one or more OCSP responses indicating status of one or more certificates;
   generating, by the update manager, the secure update package, wherein the secure update package generated by the update manager includes the one or more OCSP responses received by the update manager;
   verifying, by the UE, authenticity of software/firmware contained in the secure update package, the secure update package further including a digital signature generated using the software/firmware and the one or more certificates;
   wherein verifying includes determining authenticity of the software/firmware using the one or more certificates and CA credentials, and
   upon verification of authenticity of the software/firmware, installing, by the UE, the software/firmware;
   wherein verifying and installing are at least partly performed when the UE is offline.

2. The method according to claim 1, further comprising:
   acquiring, by the update manager, a preliminary update package prior to generating the secure update package, the preliminary update package including one or more of software/firmware from a trusted source, a digital signature generated using at least the software/firmware and a code signing certificate and one or more certificates;
   wherein the secure update package is generated to further include the preliminary package.

3. The method according to claim 1, further comprising sending, by the update manager, the secure update package to the UE.

4. The method according to claim 1, wherein a validity time window of the one or more OCSP response is represented by one or more time fields in the one or more OCSP responses.

5. The method according to claim 1, wherein the one or more OCSP responses indicate the one or more certificates have been revoked.

6. The method according to claim 1, wherein the one or more OCSP responses that indicate the one or more certificates have been revoked expires later than other previously created OCSP responses indicating the certificates have good status.

7. A method for securely updating software/firmware on a user equipment (UE), the method comprising:
   examining, by the UE, status of one or more certificates using one or more online certificate status protocol (OCSP) responses without sending one or more OCSP requests, wherein the one or more OCSP responses are contained in an update package generated by an update manager;
   storing, by the UE, most up-to-date OCSP responses for each certificate;
   verifying, by the UE, authenticity of software/firmware contained in the update package, the update package further including a digital signature generated using the software/firmware and the one or more certificates;
   wherein verifying includes determining authenticity of the software/firmware using the one or more certificates and Root Certificate Authority (CA) credentials, and
   upon verification of authenticity of the software/firmware, installing, by the UE, the software/firmware;
   wherein examining and storing are at least partly performed when the UE is offline.

8. The method according to claim 7, further comprising acquiring, by the UE, the update package.

9. The method according to claim 7, wherein the UE deletes the one or more OCSP responses after the one or more OCSP responses expire.

10. The method according to claim 7, wherein examining and storing are at least partly performed by the UE in background.

11. An update manager for generating a secure update package for provision to a user equipment (UE), the update manager comprising:
 a processor; and
 a machine readable memory storing machine executable instructions which when executed by the processor configure the update manager to:
  send one or more online certificate status protocol (OCSP) requests to one or more certificate authorities (CA);
  receive one or more OCSP responses indicating status of one or more certificates; and
  generate the secure update package, wherein the secure update package generated by the update manager includes the one or more OCSP responses received by the update manager;
 wherein the UE is configured to:
  verify authenticity of software/firmware contained in the secure update package, the secure update package further including a digital signature generated using the software/firmware and the one or more certificates;
  wherein verifying includes determining authenticity of the software/firmware using the one or more certificates and CA credentials, and
  upon verification of authenticity of the software/firmware, install the software/firmware;
  wherein verifying and installing are at least partly performed when the UE is offline.

12. The update manager according to claim 11, wherein the machine executable instructions which when executed by the processor further configure the update manager to:
 acquire a preliminary update package prior to generating the secure update package, the preliminary update package including one or more of software/firmware from a trusted source, a digital signature generated using at least the software/firmware and a code signing certificate and one or more certificates; and
 wherein the secure update package is generated further including the preliminary package.

13. The update manager according to claim 11, wherein the machine executable instructions which when executed by the processor further configure the update manager to send the secure update package to the UE.

14. The update manager according to claim 11, wherein a validity time window of the one or more OCSP responses is represented by one or more time fields in the one or more OCSP responses.

15. The update manager according to claim 11, wherein the CA signs the one or more OCSP responses.

16. The update manager according to claim 11, wherein the one or more OCSP responses indicate the one or more certificates have been revoked.

17. The update manager according to claim 11, wherein the one or more OCSP responses indicating that the one or more certificates have been revoked expire later than other previously created one or more OCSP responses indicating that the certificates have good status.

18. A user equipment (UE) for securely updating software/firmware thereon, the user equipment comprising:
 a processor; and
 a machine readable memory storing machine executable instructions which when executed by the processor configure the UE to:
  examine status of one or more certificates using one or more online certificate status protocol (OCSP) responses without sending one or more OCSP requests, wherein the one or more OCSP responses are contained in an update package generated by an update manager; and
  store most up-to-date OCSP responses for each certificate;
  verify authenticity of software/firmware contained in the update package, the update package further including a digital signature generated using the software/firmware and the one or more certificates;
  wherein verifying includes determining authenticity of the software/firmware using the one or more certificates and Root Certificate Authority (CA) credentials, and
  upon verification of authenticity of the software/firmware, installing the software/firmware;
  wherein the examining and storing at least partly performed when the UE is offline.

19. The UE according to claim 18, wherein the machine executable instructions which when executed by the processor further configure the UE to acquire the update package.

20. The UE according to claim 18, wherein the UE deletes the one or more OCSP responses after the one or more OCSP responses expire.

21. The UE according to claim 18, wherein the Root CA credentials are pre-provisioned to the user device.

22. The method according to claim 7, wherein the status of one or more certificates is examined based at least in part on previously received OCSP responses.

23. The UE according to claim 18, wherein the status of one or more certificates is examined based at least in part on previously received OCSP responses.

24. A method for generating a secure update package for provision to a user equipment (UE), the method comprising:
 sending, by an update manager, one or more online certificate status protocol (OCSP) requests to one or more certificate authorities (CA);
 receiving, by the update manager, one or more OCSP responses indicating status of one or more certificates;
 generating, by the update manager, the secure update package, wherein the secure update package generated by the update manager includes the one or more OCSP responses received by the update manager and a digital signature generated by a signing authority using software/firmware from a trusted source and a code signing certificate;
 verifying, by the UE, authenticity of software/firmware contained in the secure update package, wherein verifying includes determining authenticity of the software/firmware using the one or more certificates and CA credentials, and
 upon verification of authenticity of the software/firmware, installing, by the UE, the software/firmware;
 wherein verifying and installing are at least partly performed when the UE is offline.

* * * * *